United States Patent [19]
Mendhekar et al.

[11] Patent Number: 6,108,696
[45] Date of Patent: Aug. 22, 2000

[54] METHOD AND APPARATUS TO CONNECT A GENERAL PURPOSE COMPUTER TO A SPECIAL PURPOSE SYSTEM

[75] Inventors: Anurag Mendhekar, Sunnyvale; Mohan Vishwanath, San Jose, both of Calif.; Shinn-Der Lee, Columbus, Ind.

[73] Assignee: Online Anywhere, Santa Clara, Calif.

[21] Appl. No.: 08/970,735

[22] Filed: Nov. 14, 1997

[51] Int. Cl.[7] .............................. G06F 13/38; G06F 15/17
[52] U.S. Cl. .................... 709/217; 709/204; 709/205; 709/206; 709/219; 709/228; 345/333; 345/340; 395/500
[58] Field of Search .................................... 709/217, 219, 709/205, 206, 204, 227; 345/333, 340; 395/500

[56] References Cited

U.S. PATENT DOCUMENTS

| | | | |
|---|---|---|---|
| 5,513,269 | 4/1996 | DeVet et al. | 381/123 |
| 5,566,022 | 10/1996 | Segev | 359/172 |
| 5,579,308 | 11/1996 | Humpleman | 370/58.1 |
| 5,608,786 | 3/1997 | Gordon | 379/100 |
| 5,629,978 | 5/1997 | Blumhardt et al. | 379/201 |
| 5,694,163 | 12/1997 | Harrison | 348/13 |
| 5,787,254 | 7/1998 | Maddalozzo, Jr. et al. | 709/225 |
| 5,794,039 | 8/1998 | Guck | 395/683 |
| 5,805,073 | 9/1998 | Nagano et al. | 340/825.07 |
| 5,838,683 | 11/1998 | Corley et al. | 370/408 |
| 5,848,415 | 10/1998 | Guck | 707/10 |
| 5,864,870 | 1/1999 | Guck | 707/104 |
| 5,883,623 | 3/1999 | Cseri | 345/335 |
| 5,892,758 | 4/1999 | Argyroudis | 370/335 |
| 5,907,322 | 5/1999 | Kelly et al. | 345/327 |
| 5,909,183 | 6/1999 | Borgstahl et al. | 340/825.22 |
| 5,909,215 | 6/1999 | Berstis et al. | 345/340 |
| 5,911,776 | 6/1999 | Guck | 709/217 |
| 5,915,091 | 6/1999 | Ludwig et al. | 709/204 |
| 5,933,141 | 8/1999 | Smith | 345/339 |
| 5,933,603 | 8/1999 | Vahalia | 709/225 |
| 5,940,387 | 8/1999 | Humpleman | 370/352 |
| 5,943,496 | 8/1999 | Li et al. | 395/685 |
| 5,944,795 | 8/1999 | Civanlar | 709/227 |
| 5,945,991 | 8/1999 | Britt et al. | 345/333 |
| 5,956,737 | 9/1999 | King et al. | 707/517 |
| 5,982,303 | 11/1999 | Smith | 341/22 |
| 5,983,263 | 11/1999 | Rothrock et al. | 709/204 |
| 5,986,662 | 11/1999 | Argiro et al. | 345/424 |
| 6,009,464 | 12/1999 | Hamilton et al. | 709/219 |
| 6,031,527 | 2/2000 | Shoji et al. | 345/333 |
| 6,038,297 | 3/2000 | Garland et al. | 379/106.01 |

OTHER PUBLICATIONS

Reuters, Microwave PC a hot idea, http://news.cnet.com/news/0–1003–20...050.html, 2 pages, Sep. 1998.

Wong, Home networking: here but yet so far, http://news/cnet.com/news/0–1004–200–337671.html, 3 pages, Jan. 1999.

Miles, Samsung cooks up net microwave, http://news.cnet.com/news/0–1006–200–337327.html, 2, pages, Jan. 1999.

Dunlap, Net fridge comes in from the cold, http://news.c-net.com/news/0–1006–200–339205.html, 1 page, Feb. 1999.

Method for Implementing Bidirectional Datastream Transforms, IBM Technical Disclosure Bulletin, Vo. 32, No. 12, May 1990, pp. 338–341.

Paul Ferguson, Geoff Huston: Quality of Service on the Internet: Fact, Fiction, or Compromise?, http://www.telstra.net/gih/inet98/index.html.

*Primary Examiner*—Frank J. Asta
*Assistant Examiner*—Bunjob Jaroenchonwanit
*Attorney, Agent, or Firm*—Fliesler, Dubb Meyer & Lovejoy LLP

[57] ABSTRACT

A transducer for transforming a set of syntactic and sampled data from a general purpose system to control a special purpose system. The transducer includes a first and a second transducer modules. The first transducer module is coupled to the general purpose system for receiving the syntactic and sampled data from the general purpose system, and to transform the received data into a different set of syntactic and sampled data. The second transducer module is coupled to the first transducer module for receiving the syntactic and sampled data generated by the first transducer module, and transforming the received data into another set of syntactic and sample data that are different from the other two sets of syntactic and sampled data to control the special purpose system.

4 Claims, 3 Drawing Sheets

1

METHOD AND APPARATUS TO CONNECT A GENERAL PURPOSE COMPUTER TO A SPECIAL PURPOSE SYSTEM

BACKGROUND OF THE INVENTION

The present invention relates generally to computer software and more particularly to a versatile software language tailoring the output from a general purpose computer to control a special purpose system, such as a consumer electronic appliance.

With computers gradually permeating into every home, the convergence of computing and consumer electronics has finally started to happen. This convergence has many compelling applications in areas such as education, entertainment, home security and home automation. However, in order to enhance the convergence, a general purpose computer should be able to control different types of electronics seamlessly and efficiently. This means that various consumer electronic appliances, such as the television, a portable display, a VCR or a camera, should be easily used as input/output extensions of the computer for specific applications. This also means that the computer should be acting somewhat as a server for these appliances.

Previous methods to drive consumer appliances using a computer server are typically based on software and hardware that are specifically tailored to the appliances. The three widely known approaches are the network computer approach, the proprietary format approach and the small but complete computer approach. These approaches are typically not scalable and are relatively inflexible. They attempt to achieve a tightly coupled convergence of the computer and consumer electronics. Each time when a new application is added or a new appliance is included, a new product tying the computer to the electronics has to be built, typically from scratch.

There are also a number of options to connect consumer electronic devices to each other and to computers using various connectivity solutions. The two most popular ones are the Universal Serial Bus and the IFEE 1394 (also known as FireWire). These technologies mainly deal with the physical layer (the media) and the link layer protocols and do not deal with applications. The lack of new applications and application porting have been a major problem facing the widespread deployment of these connectivity standards.

It should be apparent that there is still a need of methods and apparatus for a general purpose computer to control different types of special purpose systems in an efficient manner.

SUMMARY OF THE INVENTION

The present invention is on methods and apparatus that will speed up the convergence of computing and consumer electronics. The present invention allows a computer to control almost any type of consumer electronics in an efficient manner, all the way to the application level.

Typically outputs from the computer include both syntactic data, such as textual programs, and sampled data, such as images. The outputs are in a general format, with the intent of being used by another general purpose computer, not by different electronic appliances with different characteristics. The present invention is on a transducer that changes both the syntactic and the sampled data from the outputs of a general purpose computer to tailor them for special purpose systems or appliances.

Some of the advantages of the present invention include:
 1. Generality: The invention can be applied to any application and any input/output device.
 2. Scalability: The invention permits the application to reside, in various proportions, on the computer or on the consumer appliance.
 3. Portability: The invention is useful and can run on full-blown computers or on embedded devices.
 4. Composability: Transducers can be composed. This permits one to build modular transducers, which allows extensibility of systems and reuse of transducers.
 5. Applications designed or mapped using the invented transduction methods can inherit the properties of transduction, such as the four benefits described directly above.

The invented transduction technique combines the strengths of automatic translation languages) and transcoding (signals) based on an invented language. In one embodiment the transducer includes two transducer modules. The first module is coupled to the general computer to receive a set of syntactic and sampled data from the computer. The module then transforms the received data to generate a different set of syntactic and sampled data. Then, the second module receives the set of syntactic and sampled data from the first module, and transforms the received data into yet another set of syntactic and sample data, which are different from the other two sets of syntactic and sampled data to control the special purpose system.

In one embodiment, there are five broad categories of transducer modules, namely, transport, display, user-interface, mapping and control modules. Using one or more transducer modules, data can be transduced, off-line or in real-time, for an input/output device.

Note that the language used in the specification has been principally selected for readability and instructional purposes, and may not have been selected to delineate or circumscribe the inventive subject matter. Also, the features and advantages described in the specification are not all-inclusive. Other aspects and advantages of the present invention will become apparent to one of ordinary skill in the art, in view of the specification, which illustrates by way of example the principles of the invention.

Figure 1:
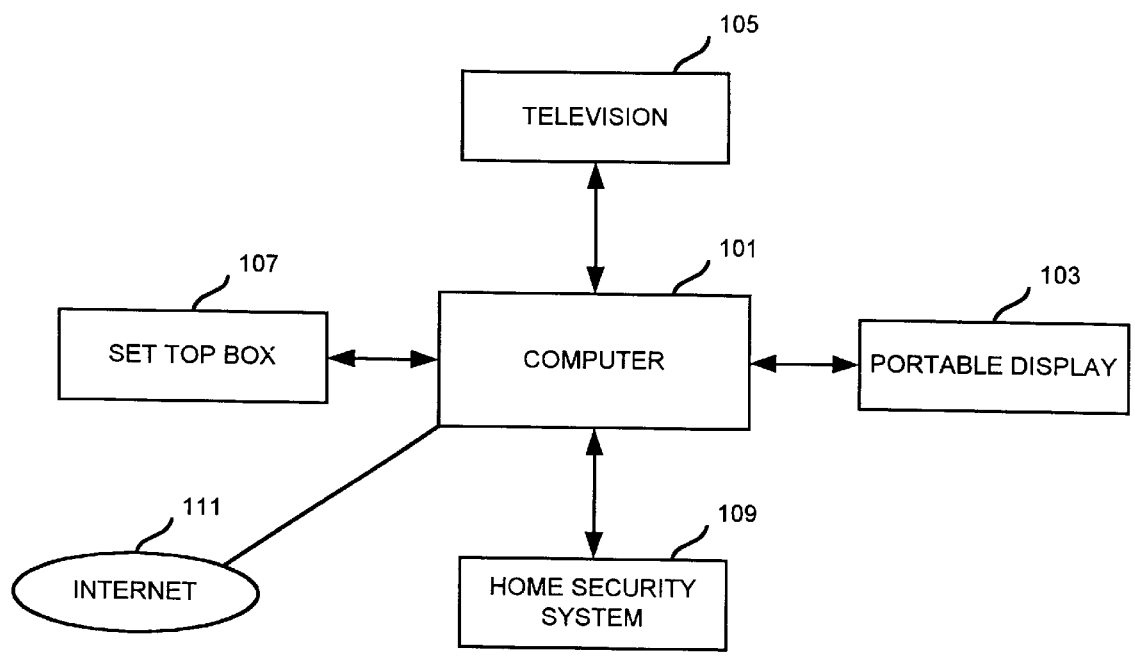
FIG. 1 shows an example of a general purpose computer controlling special purpose systems based on the present invention.
Figure 2:
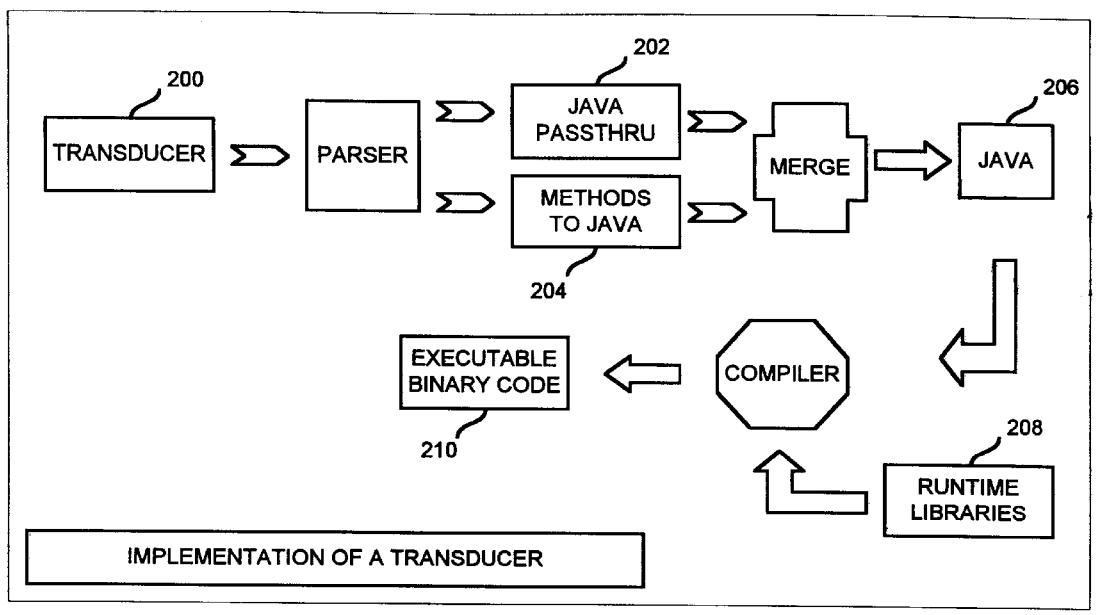
FIG. 2 illustrates an example of an implementation model of a transducer of the present invention.
Figure 3:
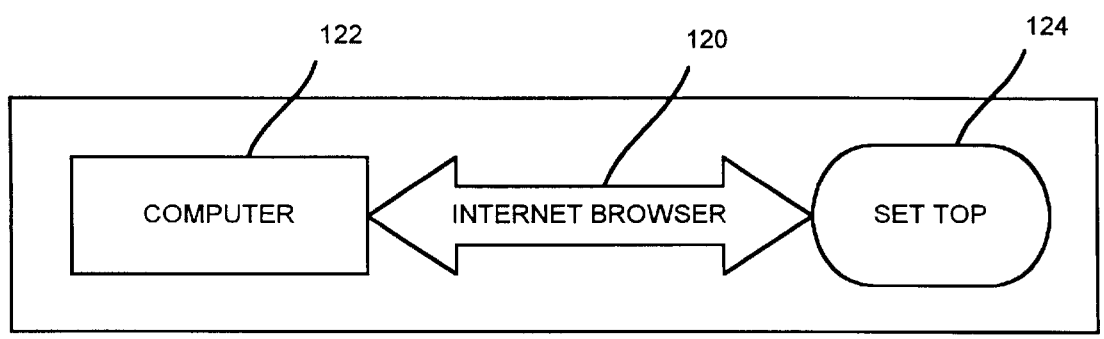
FIG. 3 shows an example of applications mapped or designed using the present invention inheriting the properties of the invented transduction methods.

Same numerals in FIGS. 1–3 are assigned to similar elements in all the figures. Embodiments of the invention are discussed below with reference to FIGS. 1–3. However, those skilled in the art will readily appreciate that the detailed description given herein with respect to these figures is for explanatory purposes as the invention extends beyond these limited embodiments.

DETAILED DESCRIPTION OF THE INVENTION

FIG. 1 shows an example of a general purpose computer 101 controlling special purpose systems, such as a portable display 103, a television 105, a set-top box 107, and a home security system 109, based on the present invention. The computer 101 may be connected to the Internet 111. Note that a special purpose system may include one or more embedded controllers.

The present invention is illustrated through the design and implementation of a transducer for transforming a device independent markup language to a device dependent markup language, using HTML as an example. This markup language example is intended to clarify the present invention, and is purely exemplary of using the invention.

Converting a general purpose markup output, such as HTML, to a device-dependent output has a wide range of applications. The device-dependent outputs can be for interactive television, printing documents from the Web and reading documents on a Personal Digital Assistant (PDA). The transducers in the present invention can harness the power of a device-independent markup language to fit the needs of specific output and interaction devices. Based on the transducers, a given general purpose markup language can be converted into a layout language that is tuned to a specific output device.

Markup is defined as any means of making explicit an interpretation of a text. Markup language is defined as a set of markup conventions used together for encoding texts. A markup language specifies what markup is allowed, what markup is required, how markup is to be distinguished from text, and what the markup means. Languages like HTML specify the first three while the HTML documentation provides the meaning of the markups.

Markup languages were initially used to make annotations or other marks within a text intended to instruct a compositor or typist how a particular piece of text was to be laid out or printed. See, for example, http://www.w3.org/MarkUp. Examples include wavy underlining to indicate boldface, special symbols for passages to be omitted or printed in a particular font and so forth. As the formatting and printing of texts was automated, the term was extended to cover all sorts of special markup codes inserted into electronic texts to govern formatting, printing, or other processing.

While markup languages originated as a way of structuring text documents, they have moved on to provide a way to specify the structure of rich interactive multimedia documents. These current generation markup languages not only structure the appearance of the document but also structure the interactivity of the document. The current generation of popular markup languages, for e.g. HTML and VRML, are quite flexible and powerful since they are general purpose, system independent and device independent.

Due to their generality and device and system independence, markup languages provide the power and flexibility needed to be used as the standard way of describing documents and also as a common format for exchanging documents. This power and flexibility comes at the expense of tailoring the output for special purpose systerns. In other words, unlike layout and/or display languages like Postscript, markup languages do not exactly specify how a page is to be displayed or printed without losing its flexibility and generality.

While this lack of complete control over the output might seem like a disadvantage, it is in fact a boon to the current generation of widely used markup languages, like HTML and VRML. This is because the number of possible output devices (display and/or interaction) that consume a document published in one of these markup languages is on the rise, for example, TVs, PDAs and phones. Therefore for certain purposes, it is desirable to have a common publishing format, which is automatically converted to an appropriate display language on the output/interaction device. HTML and VRML are emerging as one of the most popular publishing formats for documents. However, it is important to have tools to flexibly convert them for various I/O devices.

The following examples show a language that can automate the process of tailoring general purpose HTML to device-specific HTML based on transducers.

The transducer is designed to enable HTML-to-HTML transduction. It is looked upon as an extension to an existing programming language. Java is used in the following example.

One feature of the transducer is that it enables a programmer to specify transductions from HIML to a given target language that is based on SGML[\cite] like syntax, using a style that fits in naturally with HTML. This allows the programmer to program these transductions at a very high level of abstraction which allows complex transductions to be written quickly and with maximum reliability.

Each transducer defines a transduction function that maps incoming (SGML based) input-language into a target language. Each transducer consists of a set of transduction methods that are translations defined on individual tags of the input language. The input to a transducer method is syntactic and sampled data that correspond to the tag on which the method is defined. The output of a transducer method can be another set of syntactic and sampled data of the target language. In this invention, syntactic data mean data that include syntax, such as textural data or programming language. Sampled data mean data that is sampled, such as bitmaps, images, audio or video signals.

As an example, to carry out a translation of fonts, the transducer contains the following transducer method:

```
FONT face size{
//This transducer method is defined on the "FONT" tag and
is interested in two arguments of the
// FONT tag: face "and" "size".
//This is the output element:
//The code between {% à%} is evaluated and the result is
inserted in the output.
    <FONT face={% newFace(getFONTface())%} size={%
    translateSize(getFONTsize()) %}>
        //getFONTface() and getFONTsize() extract the argu-
            ment values for face and size
        code content //Indicates that transduced content
            between begin and
            //end tags must be inserted here
    </FONT>
}
```

The transducer also allows helper methods, defined as regular Java methods, to be included. In the above example, and newFace and can be translateSize defined as helper methods in the transducer.

The complete transducer can look like the following:

```
public transducer FontChanger {
    FONT face size{
        . . .
    }
    %% //Begin the helper functions.
    String newFace(String face){
        . . . //fix the face
    }
    String translateSize(String size){
        . . . //fix the size
    }
```

}

The compiler translates the transducer into plain Java classes which can then be integrated into any application. The following section illustrates various features of the transducer.

Markup-Language Transduction

The basic syntax of transduction is designed to allow a programmer to naturally express markup-language transductions. For example, to translate the fonts of the incoming markup-language, the following transducer method could be used.

FONT face size{
   FONT <face={% newFace(getFONTface())%} size={% translateSize(getFONTsize()) %}>
     .content. //Indicates that transduced content between begin
and
     //end tags must be inserted here
   </FONT>
}

This example illustrates three features. First, the body of the method above is essentially in the markup language syntax. Except for the code within '{% . . . %}', all other code is put out directly as the result of the method. The code within '{% . . . %}' is evaluated and the result of this evaluation is inserted into the output. Second, a predefined constant content. is provided. It stands for the content between the begin and end markers of the tag on which the method is defined. Third, it allows helper functions to be used within the evaluated code. These helper functions may be defined within the body of the transducer itself.

Since .content. and </FONT> will be used regularly, the following syntax is allowed and is the same as above:

FONT face size{
   <FONT face={% newFace(getFONTface())%} size={% translateSize(getFONTsize()) %}>
}

Not all tags are required to have content. These tags are known as empty tags. The above example essentially differs from the following, which is intended to transduce an HR tag, which is known to be empty. In the following, the content and end marker are ignored.

HR width{
   <HR width={% . . . %} NOSHADE>
}

Escape Mechanism to Directly Access the Parse Tree Structure

Sometimes, it is easier to directly manipulate the parse tree of the input. The following example represents the syntax that shows how this can be done.

HR (alpha){
   {% return makeNewHR(alpha) %}
}

Here the argument in parentheses, alpha, is bound to the parse tree. The output of this method is the value returned by the code in '{% . . . %}'.

Sometimes simple pattern matching based translation is not enough and it is desirable that direct manipulations to the tree structure be embeddable in the pattern matching translation. The following example illustrates how to do this.

HR width (alpha){
   <HR width={% doSomething(alpha) %}>
}

Imperative Features for Before and After Processing

These features are used in the context where some sort of initialization needs to be done for translation. It is also useful when the transducer is actually an analyzer.

Pieces of code can be introduced before and after the translation. For the direct-tree manipulation syntax, this feature is not necessary. The following examples illustrate the usage.

Frame some args . . . {
   Initially {% //do the before processing . . .
%}
   <FRAME some'args'. . . .>
}

Similarly for after:

Frame some args . . . {
   <FRAME some'args'. . .>
   finally {% //do the after processing . . .
%}
}

It is possible to have both intial and final code in the same transducer method.

In-Place Updates of Markups

Imperative update of the parse tree is supported. This is useful when only some attributes of a node need to be changed (destructively). The following syntax illustrates the usage. The special variable Content is used to indicate the content between corresponding begin and end tags. The advantage of this feature is that it reduces the load on the memory management system.

FONT face size{
   Face={% . . . %};
   Size={% . . . %};
   Content={% . . . %};
}

Exchanging Values Between Different Transducer Methods

The transductions support what are known in attribute grammar theory as inherited attributes. These are values that are passed down from parents to their children during a typical top-down traversal of the parse tree. We use the keyword enclosing to denote inherited attributes because it is typically used in transductions of outer level elements to record information provided by nested nodes/elements.

Frameset args . . . {
   enclosing Frameset ef={% makeNewFrameset( . . . ) %};
   //The 'Frameset' here is a type Declaration
}

In the above example, an enclosing variable ef can be accessed by all the transducer methods that are invoked on elements enclosed between the begin and end markers of a frameset. These methods can use this variable to access information about their syntactic context. Moreover, if the frameset element is nested, accessing ef returns the value associated with the closest enclosing frameset element.

Composition of Transducers

Transducers can be composed. This composition is achieved by straightforward (OO) inheritance. This is an effective way of combining the effects of unrelated transductions. If however, the child transducer wants to define a transduction different from its parent, there has to be a resolution of what the result finally should be. There are two options: either combine the results somehow(composition), or completely ignore the parent's transduction (overriding). There are three kinds of composition: child's result is processed by parent (beforesuper), parent's result is processed by child (aftersuper), or arbitrary (call super directly from within the body of the child's method). These three are illustrated as follows:

beforesuper FONT face size{
 . . .
}

This means that this method will be called first and the result of this method will sent as the argument to the super. If the method is not idempotent with respect to the tag (i.e., it does not return an element with the same tag as the input), an error should be signaled at runtime. The result of the method is the result returned by the super.

aftersuper FONT face size{
 . . .
}

Here, the method first calls super and then bind the result of the value returned by the super to the current set of arguments. If the super is not idempotent with respect to the tag, this method should signal an error at runtime.

Default is to override. If a different kid of composition is preferred, within the body of the transducer methods, super.translateFONT( . . .) can be used.

Analyzers

In order to syntactically differentiate the part of the transducer that analyzes from those that transduce, the keyword analyzer is used instead of the word transducer. Analyzers can be idempotent transducers. Analyzers contain enclosing attributes and initial Java code. Transducers can inherit from analyzers. The results of inheriting analyzers from transducers are undefined The transducer can be implemented as an extension to Java. It subsumes the Java syntax. The transducer code is translated by a source-to-source translation into Java. The Java code can then be compiled, and linked with the transducer runtime libraries before it can be run.

FIG. 2 illustrates an example of the implementation model of a transducer.

In the first step, the transducer 200 is split into transducer-specific 204 and non-transducer specific 202 sections. Transducer specific sections 204 include transducer methods, while non-transducer specific sections 202 include the helper functions. The non-transducer specific sections are passed through unmodified by the compiler. The transducer-specific portions are translated into Java.

The translation of transducer-specific sections involves a number of steps. First, convert method declarations into Java methods. The runtime libraries will invoke the appropriate method when a given tag is encountered. Second, translate markup-language based bodies into code that constructs parse trees. The embedded Java code in the bodies is inserted into this code.

Finally, the two Java sections are merged and the resulting Java code 206 can be compiled and linked in with the runtime library 208 to get runnable code 210.

The transducer runtime-library consists of a markup-language parser and a set of methods that are called when specific tags are encountered. The default action for these methods is to do nothing, i.e., they are identity transformations. A compiled transducer program overrides these methods.

An example of the syntax of a transducer is as follows:

Transducer
 ::=
 [public] [transducer | analyzer] identifier [extends identifier]{

Transducer-method à
%%
java-code
%%
}

Transducer-method
 ::=
[beforesuper | aftersuper] Input-pattern {
    Identifier =java-code; . . .
|
    [java-code]
|
    [Attribute-declaration. . . ]
    [initially java-code]
    output-pattern
    [finally java-code]
}

Input-pattern
 ::=
Tag identifier . . . (identifier)
Attribute-declaration
 ::=
enclosing type identifier [=java-expression] . . .
Output-pattern
 ::=
[HTMLString | java-code | .content.] . . .
Java-code
 ::=
%{ any-java-code }%

The above transduce can include a number of transducer modules, including transport transducer modules, display transducer modules, user-interface transducer modules, mapping transducer modules and control transducer modules.

Transport Transducer Modules

Transport transducer modules are used to automatically modify the transmission formats and semantics of digital data. They are primarily used to ensure that the application can be decomposed according to the needs and capabilities of the I/O devices. This is particularly important to ensure scalability of the application across various platforms (for example, the same application running on a Television and a phone).

Display Transducer Modules

They are used to modify the display characteristics of applications to match the display capability of the I/O device. Using display transducer modules, one can apply both syntactic and sampled data transformations to the application output.

Font Remapping:
    Used for changing the fonts such that they are more suitable for an output device.
Color Correction
    Used for correcting the colors such that they are more suitable for an output device.
Magnifier
    Used for scaling the output of the application such that it is more suitable for an output device.
Flicker Reduction
    Used for reducing flicker artifacts in interlaced displays.
Image Enhancement
    Used for enhancing the image quality on inferior or distant displays.

User-Interface Transducer Modules

UI transducer modules are used to map the user interface that an application was built to an user interface that is amenable to the I/O device used as the interaction device.

PopUp UIs

This module wraps around an application and provides a PopUp based user-interface. This is useful to save screen real estate and to increase the ease of use.

Audio Feedback

This module adds audio feedback to User Interfaces.

Animated UI

This module adds animation to static User Interfaces.

Context Sensitive UI

This module changes the user interface such that it explicitly represents the data that is currently being displayed. The UI is derived from the data that it is an interface to.

AutoScroll:

This module adds hands-free scrolling capability to applications.

Mapping Transducer Modules

Often applications are designed such that without a major remapping of their I/O, they cannot be used on most platforms. For example, HTML pages with frames are not easy to view on displays with low resolution. The mapping transducer is used to remap the applications I/O into a form that is suitable for the I/O device.

Frames

This module is used for re-mapping HTML pages that contain frames such that
they are removed from the HTML page or
all the frames are merged into one non-frame HTML page or
all the frames, but the main frame, is hidden in the form of PopUp frames.

Tables

This module is used for re-mapping tables such that they are tailored for I/O device.

Horizontal Scroll Free

This module remaps the data such that they do not require horizontal scrolling.

Navigation Maps

Given any HTML document, this module is used for automatically generating a site map of arbitrary depth automatically.

AutoSurt,

Given a website, this transducer produces a playback version of that web site. It uses either a breadth first or a depth first or a combination of the two or a random walk to determine the play order. It is particulary usefull when applied to customized news applications.

Control Transducer Modules

As the name suggests, control transducer modules allow the computer to control consumer appliances and collect data from them. Transduction is required since there are multiple control protocols and media access protocols for consumer appliances.

Power

This is a module to control the power consumption of devices.

VCR Control

This is a module to control a Video Cassette Recorder.

Security

This is a module to access and modify security systems.

In the above modules, the transport transducer modules can be considered as output transducer modules, which can be the module that is connected to the special purpose device.

Another type of transducer module is the decoding transducer module. It is for decoding the transduced outputs to be used by the special purpose device. For example, the decoding transducer module transforms syntactic and sample data into bits with color to be displayed on a television screen. Thus, the outputs of the decoding transducer can be just sampled data.

The present invention discloses a transducer with at least two transducer modules. Each module transforms its received syntactic and sample data. In one embodiment, the transducer includes more than two modules, and there are modules that just modify the syntactic or the sampled data, but not both.

In one embodiment, there is a number of modules, connected sequentially, one after another. Each module successively refines its received data to be more applicable to control a special purpose system.

The modules in the present invention can be re-used. For example, a series of modules may be used to control images on a color television, and another series for a monochrome television. All of the modules in the two series may be identical, except one, which is the one designating the color of each pixel. After one has implemented the first series, it would be easy to implement the second.

This specification describes a transducer module modifying both syntactic data and sampled data. In one embodiment, a mini-module transduces syntactic data and another mini-module transduces sampled data; both mini-modules together constitute a transducer module in the present invention.

The present invention is also applicable in reverse. In other words, the present invention can be used to transduce syntactic and sampled data from a special purpose system to control a general purpose system. For example, blanking signals from a television can be transduced and displayed as HTML on a computer.

As discussed above, applications designed or mapped using the invented transduction methods can inherit the properties of transduction, such as the benefits of generality, scalability, portability and composability. FIG. 3 shows such an example, where an Internet Browser 120 designed or mapped using the present invention can run entirely on a personal computer 122, partly on a personal computer and partly on a set-top box 124 or entirely on a set-top box 124.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A transducer for transforming a set of syntactic and sampled data from a general purpose system to control a special purpose system, the transducer comprising:

a first transducer module
operationally coupled to the general purpose system for receiving the syntactic and sampled data from the general purpose system, and
transforming the received data into a different set of syntactic and sampled data; and a second transducer module
operationally coupled to the first transducer module for receiving the syntactic and sampled data generated by the first transducer module, and
transforming the received data into another set of syntactic and sample data that are different from the other two sets of syntactic and sampled data to control the special purpose system;

wherein at least one transducer module is separated into two parts, with one part being translated into a programming language, and with the two parts later merged after the translation.

2. A transducer as recited in claim 1 wherein:

the general purpose system is a computer, and the special purpose system is a television.

3. A transducer as recited in claim 1 wherein:

the set of syntactic and sampled data from the general purpose system are in HTML format.

4. A transducer for transforming a set of syntactic and sampled data from a special purpose system to control a general purpose system, the transducer comprising:

a first transducer module
- operationally coupled to the special purpose system for receiving the syntactic and sampled data from the special purpose system, and
- transforming the received data into a different set of syntactic and sampled data; and a second transducer module
- operationally coupled to the first transducer module for receiving the syntactic and sampled data generated by the first transducer module, and
- transforming the received data into another set of syntactic and sample data that are different from the other two sets of syntactic and sampled data to control the general purpose system;

wherein at least one transducer module is separated into two parts, with one part being translated into a programming language, and with the two parts later merged after the translation.

* * * * *